(12) United States Patent
Zhu et al.

(10) Patent No.: US 12,117,849 B2
(45) Date of Patent: Oct. 15, 2024

(54) UAV-ASSISTED FEDERATED LEARNING RESOURCE ALLOCATION METHOD

(71) Applicant: NANJING UNIVERSITY OF POSTS AND TELECOMMUNICATIONS, Nanjing (CN)

(72) Inventors: Qi Zhu, Nanjing (CN); Chaoyi Liu, Nanjing (CN)

( * ) Notice: Subject to any disclaimer, the term of this patent is extended or adjusted under 35 U.S.C. 154(b) by 0 days.

(21) Appl. No.: 18/582,491

(22) Filed: Feb. 20, 2024

(65) Prior Publication Data

US 2024/0288876 A1 Aug. 29, 2024

Related U.S. Application Data

(63) Continuation of application No. PCT/CN2023/120446, filed on Sep. 21, 2023.

(30) Foreign Application Priority Data

Feb. 15, 2023 (CN) .......................... 202310113221.9

(51) Int. Cl.
*G05D 1/48* (2024.01)
*G05D 1/644* (2024.01)
(Continued)

(52) U.S. Cl.
CPC .............. *G05D 1/48* (2024.01); *G05D 1/644* (2024.01); *G06N 3/098* (2023.01);
(Continued)

(58) Field of Classification Search
CPC ...... G05D 1/48; G05D 1/644; G05D 2101/15; G05D 2101/22; G05D 2109/20; G06N 3/098

See application file for complete search history.

(56) References Cited

U.S. PATENT DOCUMENTS

2019/0265705 A1* 8/2019 Zhang ................. G05D 1/0061
2022/0371730 A1* 11/2022 Wang .................... B64U 10/10
2024/0038077 A1* 2/2024 Bhat ...................... G05D 1/689

FOREIGN PATENT DOCUMENTS

| CN | 113625751 A | 11/2021 |
| CN | 114980157 A | 8/2022 |

(Continued)

OTHER PUBLICATIONS

Internation Search Report of PCT/CN2023/120446, Mailed Jan. 3, 2024.

*Primary Examiner* — Nga X Nguyen (57) ABSTRACT

The present application provides an unmanned aerial vehicle (UAV)-assisted federated learning resource allocation method for an UAV-assisted federated learning wireless network scenario, which takes into account the effect of altitude of the UAV on the coverage range in order to achieve an equilibrium between the total energy consumption of the user and federated learning performance. The method simultaneously considers the total energy consumption of the user and the federated learning performance, defines the total cost function of the system. The total cost function consists of weighting of the total energy consumption of the user and the inverse of the number of users participating in federated learning, and forms the optimization problem with a minimization of the total cost function.

8 Claims, 4 Drawing Sheets

(51) Int. Cl.
*G06N 3/098* (2023.01)
*G05D 101/00* (2024.01)
*G05D 101/15* (2024.01)
*G05D 109/20* (2024.01)

(52) U.S. Cl.
CPC ..... *G05D 2101/15* (2024.01); *G05D 2101/22* (2024.01); *G05D 2109/20* (2024.01)

(56) References Cited

FOREIGN PATENT DOCUMENTS

| | | |
|---|---|---|
| CN | 114980160 A | 8/2022 |
| CN | 115622616 A | 1/2023 |
| KR | 20220109301 A | 8/2022 |

\* cited by examiner

UAV-ASSISTED FEDERATED LEARNING RESOURCE ALLOCATION METHOD

CROSS-REFERENCE TO RELATED APPLICATIONS

This application claims priority to Chinese Patent Application No. 202310113221.9, titled "UAV-assisted Federated Learning Resource Allocation Method", filed Feb. 15, 2023, the entire disclosure of which is incorporated herein by reference.

TECHNICAL FIELD

The present application relates to the field of communication technology, and specifically relates to an UAV-assisted federated learning joint learning performance and resource allocation method.

BACKGROUND

In recent years, the popularity of smart devices and the increasing scale of the Internet of Things (IoT) have led to an exponential growth in the amount of data. By analyzing and processing these data, some smart applications (face recognition, smart driving, voice recognition) have been developed at light speed, but they have also given rise to the issue of data security and privacy. With the gradual concern about privacy, more and more entities begin to emphasize the right of ownership and use of data, which reduces the data exchanges between different entities, and makes each entity gradually become a "data silos". In order to solve the above problems, make greater use of the value of data, and improve the performance of AI algorithms, Federated Learning (FL) is emerged.

Federated Learning is able to coordinate all parties for joint learning without exposing the data of all parties, which improves the utilization of resources and guarantees the privacy of users compared with traditional centralized learning. In the process of federated learning, each participant does not need to upload the local raw data, but only needs to upload the neural network model parameters related to the data, and then the main server will securely aggregate the model parameters and feed them back to the participants, who will update the global model according to the dataset they own, which effectively ensures the security and privacy of sensitive data of each participant. In order to further improve the performance of federated learning, UAVs are beginning to be combined with federated learning as an airborne base station, and UAVs, as airborne mobile base stations, are able to quickly construct regional wireless networks and provide emergency communication services. Due to the combination of UAVs and federated learning, compared with the fixed base station scenario, UAVs can find a suitable position to reduce the energy consumption of the user, and to a certain extent alleviate the user's competition for wireless resources, and a reasonable resource allocation scheme can effectively reduce the energy consumption of the user, and enhance the efficiency of federated learning.

SUMMARY

The present application aims to propose an UAV-assisted federated learning resource allocation method. The method considers the influence of the flight altitude of the UAV on the coverage range and proposes a resource allocation mechanism to guarantee the learning performance while reducing the total energy consumption of the user.

To achieve the above functions, the present application designs an UAV-assisted federated learning resource allocation method, which constructs an optimization problem P with minimization of the total cost function, determines the optimal horizontal position decision of the UAV based on the user's state and the local accuracy, determines the optimal local accuracy based on the state of the UAV and the user, determines the optimal user resource allocation decision based on the position of the UAV and the local accuracy, and changes the flight altitude of the UAV, repeats the above steps to obtain the optimal altitude of the UAV to reduce the total energy consumption of the participating learning user.

In order to solve the above technical problems, the present application adopts the following technical program:

In a first aspect, the present application provides an UAV-assisted federated learning resource allocation method, including:

S1. determining a total cost function and constraints of a system based on total energy consumption of users that participate in the federated learning and an inverse of a number of the users, and constructing an optimization problem P with a minimization of the total cost function;

S2. solving by the optimization problem P to obtain an optimal horizontal position of the unmanned aerial vehicle (UAV) m, an optimal local accuracy, an optimal user resource allocation decision, and an optimal altitude of the UAV m; and S3. the UAV m flying to the optimal horizontal position and the optimal altitude of the UAV m, and the users determine to participate in the federated learning within a coverage range of the UAV m based on the optimal user resource allocation decision and the optimal local accuracy.

In some embodiment, the S1, constructing the optimization problem P for minimizing the total cost function, includes:

S11. a set of users is denoted as $Na=\{1, 2 \ldots N\}$, a set of the users within the coverage range of the UAV m is denoted as $N_m$; a distance between the user i and the UAV m is:

$$d_{im} = \sqrt{h^2 + \|q_m - q_i\|_2^2};$$

where h denotes the altitude of the UAV m, $q_m = \{x_m, y_m\}$ denotes a horizontal position of the UAV m, $q_i = \{x_i, y_i\}$ denotes a position of the user i, and a channel gain of the user i is:

$$g_i = g_0 \left(\frac{d_{im}}{d_0}\right)^{-\alpha};$$

where $g_0$ is a channel interference power at time $d_0=1$ m and $\alpha$ is a path loss exponent;

S12. energy consumption of the user's terminal during the federated learning comprises training energy and communication energy;

S13. $D^i$ denotes an amount of data of the user, $f_i$ denotes a number of revolutions per second of a CPU of the user i, $C_i$ denotes a number of revolutions of the CPU of the user i to process a sample data, and $I_l$ denotes a number of rounds of local training when a local accuracy is achieved η;

$$I_i = \frac{2}{(2-L\delta)\delta\gamma}\log\left(\frac{1}{\eta}\right);$$

wherein L, γ are relevant parameters about a neural network loss function, δ is a training learning step of the federated learning;

training energy consumption $E_i^{comp}$ of the user i in one iteration of the federated learning is denoted as:

$$E_i^{comp} = \kappa I_i C_i D_i f_i^2;$$

S14. after the user i completes the local training, a trained model is uploaded to the UAV m by a frequency division multiple access (FDMA); $b_i$ denotes a bandwidth allocated to the user i, $p_i$ denotes a transmission power of the user i, $N_0$ denotes a noise power spectral density, and according to a Shannon's formula, an achievable transmission rate $R_i$ of the user i is:

$$R_i = b_i \log_2\left(1 + \frac{g_i p_i}{N_0 b_i}\right);$$

assuming that a size of data of the neural network model w is s and communication energy consumption $E_i^{comm}$ of the user i is:

$$E_i^{comm} = p_i t_i = p_i \frac{s}{b_i \log_2\left(1 + \frac{g_i p_i}{N_0 b_i}\right)};$$

S15. when a global model accuracy is required to be achieved $\varepsilon_0$, a number of communication rounds $I_g$ is:

$$I_g = \frac{2L^2}{\gamma^2 \xi} \log\frac{1}{\varepsilon_0} \frac{1}{1-\eta};$$

where ξ denotes relevant parameters in a local neural network training, a total energy consumption $E^{total}$ of a whole federated learning process is:

$$E^{total} = I_g \sum_{i \in N_m}^{|N_m|} (E_i^{comm} + E_i^{comp});$$

S16. the total cost function C is defined as:

$$C = E_{total} + \rho \frac{1}{N_m};$$

a target function is:

$$\min_{q_m,h,f,t,p,b,\eta} C = \min_{q_m,h,f,t,p,b,\eta} \frac{a}{(1-\eta)}\left(\sum_{i \in N_m}^{|N_m|} \log\left(\frac{1}{\eta}\right) v C_i D_i f_i^2 + t_i p_i\right) + \frac{\rho}{N_m};$$

wherein $$a = \frac{2L^2}{\gamma^2 \zeta} \log\frac{1}{\varepsilon_0}$$

and $$v = \frac{2}{(2-L\delta)\delta\gamma}$$

denote fixed values and ρ denotes a weighting factor;

S17. considering the total energy consumption of the users and a performance of federated learning, the optimization problem P of the system is:

$$\min_{q_m,h,f,t,p,b,\eta} \frac{a}{(1-\eta)}\left(\sum_{i \in N_m}^{|N_m|} \log\left(\frac{1}{\eta}\right) v C_i D_i f_i^2 + t_i p_i\right) + \frac{\rho}{N_m};$$

the constraints are:

C1: $0 \leq f_i \leq f_i^{max}$

C2: $0 \leq p_i \leq p_i^{max}$

C3: $I_g\left(t_i + I_i \frac{C_i D_i}{f_i}\right) \leq T$

C4: $t_i \geq \frac{s}{R_i}$

C5: $\|q_m - q_i\|_2^2 \leq r^2$

C6: $h^{min} \leq h \leq h^{max}$

C7: $\sum_{i \in N_m}^{|N_m|} b_i \leq B, b_i > 0$

C8: $0 \leq \eta \leq 1$;

where T is a total pre-estimated completion time of the federated learning, B denotes a total bandwidth owned by the UAV m, $f_i^{max}$ denotes a maximum computation frequency of the user i, $p_i^{max}$ denotes a maximum transmission power of the user i, and, $h^{min}$ and $h^{max}$ denote a minimum altitude and a maximum altitude of the UAV m for flying, respectively; under a constraint of a maximum delay allowed by the federated learning, a position of the UAV m (the horizontal position $q_m = \{x,y\}$ and the altitude h), the transmission power $p = [p_1, \ldots p_{N_m}]$ and a computation frequency $f = [f_1, \ldots f_{N_m}]$ of the user i, a transmission bandwidth $b = [b_1, \ldots b_{N_m}]$, transmission time $t = [t_1 \ldots t_{N_m}]$ and the local accuracy η are optimized jointly to minimize the target function; constraints C1 and C2 limit the computation frequency and the transmission power of the user i; a constraint C3 denotes that a total delay of the users that participate in the federated learning is not greater than a preset maximum value; a constraint C4 limits the transmission delay, i.e., a transmission of the model must be completed within specified transmission time, and $R_i$ is the achievable transmission rate of the user i; a constraint C5 limits the position of the UAV m and the distance between the user and the UAV m not greater than the coverage range of the UAV m; a constraint C6 limits a flight altitude range of the UAV m; the constraint C7 indicates that a sum of the bandwidth allocated to all users within the coverage range of the UAV m is not greater than a total bandwidth B; and the constraint C8 specifies a range of constraints on the local training accuracy.

In some embodiment, the S2. solving the optimization problem P includes:

S2.1. setting an initial horizontal flight position $q_m$ and a minimum flight altitude h of the UAV m;

S2.2. setting an initial user resource allocation decision and an initial local accuracy $\eta$ within the coverage range of the UAV m, wherein the user resource allocation decision comprises the computation frequency f, the transmission time t, the transmission power P and the transmission bandwidth b;

S2.3. solving by the optimization problem P based on h, f, t, p, b, $\eta$, to obtain the optimal horizontal position of the UAV m;

S2.4. solving by the optimization problem P based on h, f, t, p, b and the optimal horizontal position $q_m$ of the UAV m obtained in the S2.3, to obtain the optimal local accuracy $\eta$;

S2.5. solving by the optimization problem P based on h, the optimal horizontal position $q_m$ of the UAV m obtained in the S2.3 and the optimal local accuracy $\eta$ obtained in the S2.4;

S2.6. repeating the S2.3 to S2.5 until a target total cost function reaches convergence;

S2.7. changing the altitude h of the UAV m based on a minimum change value $\Delta h_{min}$ of the altitude h;

S2.8. in response to the altitude of the UAV m not greater than a preset maximum altitude, repeating the S2.2 to S2.7 until the altitude of the UAV m is greater than the maximum altitude, obtaining the optimal horizontal position $q_m$ of the UAV m, the optimal local accuracy $\eta$, the optimal user resource allocation decision, and the optimal altitude h of the UAV m when the total cost function is minimized.

In some embodiment, the S2.3, solving by the optimization problem P to obtain the optimal horizontal position of the UAV m, includes:

the altitude of the UAV m is h, an angle of entrapment is $\theta$, and a radius of coverage of the UAV m is r:

$r = h \tan(\theta)$ when h, f, t, p, b, $\eta$ are determined, optimizing the horizontal position $q_m$ of the UAV m; since optimizing the horizontal position of the UAV m only affects the communication energy consumption of the user i; the optimization problem P is equivalent to an optimization problem P1:

$$\min_{q_m} \sum_{i \in N_m}^{|N_m|} p_i \frac{s}{R_i};$$

the constraints are:

$$t_i \geq \frac{s}{R_i} \quad \text{C4}$$

$C5: \|q_m - q_i\|_2^2 \leq r^2;$ introducing slack variables $\beta$, the optimization problem P1 is equivalent to an optimization problem P2:

$$\min_{q_m, \beta} \sum_{i \in N_m}^{|N_m|} p_i s \beta_i;$$

the constraints are:

$C5: \|q_m - q_i\|_2^2 \leq r^2$ $C9: s\beta_i \leq t_i$ $$b_i \log_2\left(1 + \frac{p_i g_0}{b_i N_0 (\|q_m - q_i\|_2^2 + h^2)}\right) \geq \frac{1}{\beta_i}; \quad \text{C10}$$

introducing slack variables $S_{m,i} = \|q_m - q_i\|_2^2$, the constraint C10 is expanded at a feasible solution $S_{m,i}^0 = \|q_m^0 - q_i\|_2^2$ using a first-order Taylor expansion:

$$b_i \log_2\left(1 + \frac{p_i g_0}{b_i N_0 (S_{m,i} + h^2)}\right) \geq \lambda(S_{m,i} - S_{m,i}^0) + \kappa$$

$$\lambda = -\frac{b_i g_0 p_i \log_2(e)}{N_0 b_i (S_{m,i}^0 + h^2)\left(S_{m,i}^0 + h^2 + \frac{g_0 p_i}{N_0 b_i}\right)}$$

$$\kappa = b_i \log_2\left(1 + \frac{g_0 p_i}{N_0 b_i (S_{m,i}^0 + h^2)}\right);$$

where, $\lambda$, $\kappa$ denote intermediate variables; the optimization problem P2 is further transformed into an optimization problem P3:

$$\min_{q_m, \beta} \sum_{i \in N_m}^{|N_m|} p_i s \beta_i$$

the constraints are:

$C5: \|q_m - q_i\|_2^2 \leq r^2$ $C9: s\beta_i \leq t_i$ $$\lambda(S_{m,i} - S_{m,i}^0) + \kappa \geq \frac{1}{\beta_i}; \quad \text{C11}$$

the optimization problem P3 is transformed into a convex problem, which is solved using a successive convex approximation (SCA) method to obtain the optimal horizontal position of the UAV m.

In some embodiment, the S2.4 solving by the optimization problem P to obtain the optimal local accuracy η, includes:

when h, $q_m$, f, t, p, b is determined, the optimization problem P is transformed into an optimization problem P4:

$$\min_{\eta} \frac{\lambda_1 \log_2\left(\frac{1}{\eta}\right) + \lambda_2}{(1-\eta)};$$

the constraints are:

$$I_g\left(t_i + I_l \frac{C_i D_i}{f_i}\right) \leq T; \quad \text{C3}$$

C8: $0 \leq \eta \leq 1$ wherein $$\lambda_1 = a \sum_{i \in N_m}^{|N_m|} \kappa C_i D_i f_i^2, \quad \lambda_2 = a \sum_{i \in N_m}^{|N_m|} t_i p_i;$$

the constraint C3 is equivalent to $t_i \leq \upsilon(\eta_i)$, where $$\upsilon(\eta) = \frac{1-\eta}{a} T + \frac{C_i D_i \log(\eta) v}{f_i},$$

since $\upsilon(\eta)$ is a convex function, the constraint C3 is transformed into $\eta^{min} \leq \eta \leq \eta^{max}$, where $$\eta^{max} = \min_{i \in N_m} \eta_i^{max}, \quad \eta^{min} = \max_{i \in N_m} \eta_i^{min};$$

the optimization problem P4 is transformed into an optimization problem P5:

$$\min_{\eta} \frac{\lambda_1 \log\left(\frac{1}{\eta}\right) + \lambda_2}{(1-\eta)};$$

the constraints are:

C12: $\eta^{min} \leq \eta \leq \eta^{max}$;

solving the optimization problem P5 is equivalent to finding roots of a nonlinear function $$H(\zeta) = \min_{\eta^{min} \leq \eta \leq \eta^{max}} \lambda_1 \log(1/\eta) + \lambda_2 - \zeta(1-\eta),$$

which is solved by using a Dinkelbach Method method.

In some embodiment, the S2.5 solving by the optimization problem P to obtain the optimal user resource allocation decision, includes:

when $q_m$, h and η are determined, optimizing f, t, p and b, and the optimization problem P is transformed into an optimization problem P6:

$$\min_{f,t,p,b} \frac{a}{(1-\eta)} \sum_{i \in N_m}^{|N_m|} \left(v\log\left(\frac{1}{\eta}\right) C_i D_i f_i^2 + p_i t_i\right);$$

the constraints are:

C1: $0 \leq f_i \leq f_i^{max}$

C2: $0 \leq p_i \leq p_i^{max}$ $$I_g\left(t_i + I_l \frac{C_i D_i}{f_i}\right) \leq T \quad \text{C3}$$

$$t_i \geq \frac{s}{R_i} \quad \text{C4}$$

$$\sum_{i \in N_m}^{|N_m|} b_i \leq B, \quad b_i > 0; \quad \text{C7}$$

the optimization problem P6 is split into two optimization subproblems;

a first subproblem, denoted as subproblem P6-1, is to solve remaining variables f, t and P of the optimization problem P6 under the transmission bandwidth b given:

$$\min_{f,t,p} \frac{a}{(1-\eta)} \sum_{i \in N_m}^{|N_m|} \left(v\log\left(\frac{1}{\eta}\right) C_i D_i f_i^2 + p_i t_i\right);$$

the constraints are:

C1: $0 \leq f_i \leq f_i^{max}$

C2: $0 \leq p_i \leq p_i^{max}$ $$I_g\left(t_i + I_l \frac{C_i D_i}{f_i}\right) \leq T \quad \text{C3}$$

$$t_i \geq \frac{s}{R_i}; \quad \text{C4}$$

$$f_i = \frac{I_l C_i D_i}{\frac{T}{I_g} - t_i}$$

and $$p_i = \frac{N_0 b_i}{g_i}\left(2^{\frac{s}{t_i p_i}} - 1\right)$$

are obtained according to the constraints C3, C4, and then are brought into the constraints C1, C2, and subproblem P6-1 is transformed into an optimization problem P7:

$$\min_{f,t,p} \frac{a}{(1-\eta)} \sum_{i \in N_m}^{|N_m|} \left(v\log\left(\frac{1}{\eta}\right) C_i D_i \left(\frac{I_l C_i D_i}{\frac{T}{I_g} - t_i^*}\right)^2 + \frac{N_0 b_i}{g_i}\left(2^{\frac{s}{t_i^* b_i}} - 1\right) t_i^*\right);$$

the constraints are:

$$0 \leq \frac{I_i C_i D_i}{\frac{T}{I_g} - t_i} \leq f_i^{max} \quad \text{C13}$$

$$0 \leq \frac{N_0 b_i}{g_i}\left(2^{\frac{s}{t_i b_i}} - 1\right) \leq p_i^{max}; \quad \text{C14}$$

a maximum value and a minimum value of $t_i$ are obtained from constraints C13 and C14; the optimization problem P7 is further transformed into an optimization problem P8:

$$\min_t \frac{a}{(1-\eta)} \sum_{i \in N_m}^{|N_m|} \left( v\log\left(\frac{1}{\eta}\right) C_i D_i \left(\frac{I_i C_i D_i}{\frac{T}{I_g} - t_i}\right)^2 + \frac{N_0 b_i}{g_i}\left(2^{\frac{s}{t_i b_i}} - 1\right) t_i \right);$$

the constraints are:

C15: $t_i^{min} \leq t_i \leq t_i^{max}$;

according to the optimization problem P8, when $t_i$ is satisfied $$\left|\frac{\partial E_i^{comm}}{\partial t_i}\right| = \left|\frac{\partial E_i^{comp}}{\partial t_i}\right|,$$

it is an optimal solution $t_i^*$, which is obtained using a bisection method, and $f_i^*$ and $p_i^*$ are further obtained;

the second subproblem, denoted as subproblem P6-2, is to solve the transmission bandwidth b of the optimization problem under variables f, t, p given:

$$\min_b \sum_{i \in N_m}^{|N_m|} \frac{b_i t_i N_0}{g_i}\left(2^{\frac{s}{t_i b_i}} - 1\right);$$

the constraints are:

$$\sum_{i \in N_m}^{|N_m|} b_i \leq B, b_i > 0; \quad \text{C7}$$

since the optimization problem P8 is convex, an optimal expression of b is obtained by solving using the KKT condition;

optimizing the subproblem P6-2 leads to a change in bandwidth b, which in turn affects f, t, p, in the subproblem P6-1, and iteratively solves the subproblem P6-1 and subproblem P6-2 are solved by iteration to obtain the optimal f, t, p and b.

A second aspect, the present application provides an UAV-assisted federated learning resource allocation device, including a processor and a storage medium;
wherein the storage medium is configured to store instructions;
the processor for operating in accordance with the instructions to perform the method according to the first aspect.

A third aspect, the present application provides a storage medium having a computer program stored thereon, wherein the computer program is executed by the processor to implement the method according to the first aspect.

A fourth aspect, the present application provides a computing device, including:
one or more processors, one or more memories, and one or more programs, wherein the one or more programs are stored in the one or more memories and configured to be executed by the one or more processors, wherein the one or more programs includes instructions for executing the method according to the method of the first aspect.

Advantages of the present application over the related art include:

1. The present application, for an UAV-assisted federated learning wireless network scenario, takes into account the influence of the altitude of the UAV m on the coverage range, and jointly considers defining the inverse of the total energy consumption of the user and the number of participating users as the cost function of the system.

2. The present application jointly considers the learning performance and the interests of the user in the process of federated learning, and reduces the user energy consumption while safeguarding the performance of federated learning by jointly optimizing the position of the UAV m (horizontal position and altitude), the transmission power of the user, the computation frequency, the transmission bandwidth, the transmission time, and the local accuracy.

3. Unlike the federated learning methods in traditional scenarios, the method makes full use of the mobility of the UAV m, and achieves a balanced optimization of the user's energy consumption and the federated learning performance by optimizing the horizontal position and altitude of the UAV m.

DETAILED DESCRIPTION OF THE EMBODIMENTS

The present application is further described below in conjunction with the accompanying drawings. The following embodiments are only used to illustrate the technical solution of the present application more clearly, and cannot be used to limit the scope of the present application.

In the description of the present application, reference is made to the terms "an embodiment", "some embodiments", "schematic embodiment", "example", "specific example" and "some examples", means that the specific features, structures, materials, or characteristics described in connection with the embodiment or example are included in at least one embodiment or example of the present application. In this specification, schematic expressions of the above terms do not necessarily refer to the same embodiment or example. Moreover, the specific features, structures, materials, or characteristics described may be combined in any one or more embodiments or examples in a suitable way.

First Embodiment

As shown in FIGS. 1 and 3-5, a UAV-assisted federated learning resource allocation method includes:

S1. determining a total cost function and constraints of a system based on total energy consumption of users that participate in the federated learning and an inverse of a number of the users, and constructing an optimization problem P with a minimization of the total cost function;

S2. solving by the optimization problem P to obtain an optimal horizontal position $q_m$ of the UAV m, an optimal local accuracy $\eta$, an optimal user resource allocation decision, and an optimal altitude h of the UAV m.

In some embodiment, the S2. solving the optimization problem P includes:

S2.1. setting an initial horizontal flight position $q_m$ and a minimum flight altitude h of the UAV m;

S2.2. setting an initial user resource allocation decision and an initial local accuracy $\eta$ within the coverage range of the UAV m, wherein the user resource allocation decision comprises the computation frequency f, the transmission time t, the transmission power p and the transmission bandwidth b;

S2.3. solving by the optimization problem P based on h, f, t, p, b, $\eta$, to obtain the optimal horizontal position of the UAV m;

S2.4. solving by the optimization problem P based on h, f, t, p, b and the optimal horizontal position $q_m$ of the UAV m obtained in the S2.3, to obtain the optimal local accuracy $\eta$;

S2.5. solving by the optimization problem P based on h, the optimal horizontal position $q_m$ of the UAV m obtained in the S2.3 and the optimal local accuracy $\eta$ obtained in the S2.4;

S2.6. repeating the S2.3 to S2.5 until a target total cost function reaches convergence;

S2.7. changing the altitude h of the UAV m based on a minimum change value $\Delta h_{min}$ of the altitude h;

S2.8. in response to the altitude of the UAV m not greater than a preset maximum altitude, repeating the S2.2 to S2.7 until the altitude of the UAV m is greater than the maximum altitude, obtaining the optimal horizontal position $q_m$ of the UAV m, the optimal local accuracy $\eta$, the optimal user resource allocation decision, and the optimal altitude h of the UAV m when the total cost function is minimized.

S3. the UAV m flying to the optimal horizontal position $q_m$ and the optimal altitude h of the UAV m, and the users determine to participate in the federated learning within a coverage range of the UAV m based on the optimal user resource allocation decision and the optimal local accuracy $\eta$.

In some embodiment, the S1, constructing the optimization problem P for minimizing the total cost function, includes:

S11. a set of users is denoted as N=={1, 2 . . . N}, a set of the users within the coverage range of the UAV m is denoted as $N_m$; a distance between the user i and the UAV m is:

$$d_{im} = \sqrt{h^2 + \|q_m - q_i\|_2^2};$$

where h denotes the altitude of the UAV m, $q_m=\{x_m, y_m\}$ denotes a horizontal position of the UAV m, $q_i=\{x_i, y_i\}$ denotes a position of the user i, and a channel gain of the user i is:

$$g_i = g_0 \left(\frac{d_{im}}{d_0}\right)^{-\alpha};$$

where $g_0$ is a channel interference power at time $d_0=1$ m and $\alpha$ is a path loss exponent;

S12. energy consumption of the user's terminal during the federated learning comprises training energy and communication energy;

S13. $D_i$ denotes an amount of data of the user, $f_i$ denotes a number of revolutions per second of a CPU of the user i, $C_i$ denotes a number of revolutions of the CPU of the user i to process a sample data, and $I_l$ denotes a number of rounds of local training when a local accuracy is achieved $\eta$;

$$I_l = \frac{2}{(2 - L\delta)\delta \gamma} \log\left(\frac{1}{\eta}\right);$$

wherein L, $\gamma$ are relevant parameters about a neural network loss function, $\delta$ is a training learning step of the federated learning;

training energy consumption $E_i^{comp}$ of the user i in one iteration of the federated learning is denoted as:

$$E_i^{comp} = \kappa I_l C_i D_i f_i^2;$$

S14. after the user i completes the local training, a trained model is uploaded to the UAV m by a frequency division multiple access (FDMA); $b_i$ denotes a bandwidth allocated to the user i, $p_i$ denotes a transmission power of the user i, $N_0$ denotes a noise power spectral density, and according to a Shannon's formula, an achievable transmission rate $R_i$ of the user i is:

$$R_i = b_i \log_2\left(1 + \frac{g_i p_i}{N_0 b_i}\right);$$

assuming that a size of data of the neural network model w is s and communication energy consumption $E_i^{comm}$ of the user i is:

$$E_i^{comm} = p_i t_i = p_i \frac{s}{b_i \log_2\left(1 + \frac{g_i p_i}{N_0 b_i}\right)};$$

S15. when a global model accuracy is required to be achieved $\varepsilon_0$, a number of communication rounds $I_g$ is:

$$I_g = \frac{2L^2}{\gamma^2 \xi} \log \frac{1}{\varepsilon_0} \frac{1}{1-\eta};$$

where $\xi$ denotes relevant parameters in a local neural network training, a total energy consumption $E^{total}$ of a whole federated learning process is:

$$E^{total} = I_g \sum_{i \in N_m}^{|N_m|} (E_i^{comm} + E_i^{comp});$$

S16. Considering that the user's battery capacity is limited and the energy consumption of the terminal device directly affects the user's experience, the total energy consumption of the user is defined as part of the cost function. Since the performance of federated learning is related to the number of participating users, the more the number of participating users, the faster the learning convergence will be, and the more the data diversity of the participating users, the better the generalisation ability of the model obtained, so the inverse of the number of participating users is defined as the other part of the cost function, which indicates the performance of federated learning. In order to achieve a balance between the energy consumption of users and the performance of federated learning, the total cost function C is defined as:

$$C = E_{total} + \rho \frac{1}{N_m};$$

a target function is:

$$\min_{q_m,h,f,t,p,b,\eta} C = \min_{q_m,h,f,t,p,b,\eta} \frac{a}{(1-\eta)} \left( \sum_{i \in N_m}^{|N_m|} \log\left(\frac{1}{\eta}\right) v C_i D_i f_i^2 + t_i p_i \right) + \frac{\rho}{N_m};$$

wherein $$a = \frac{2L^2}{l^2 \zeta} \log \frac{1}{\varepsilon_0}$$

and $$v = \frac{2}{(2 - L\delta)\delta\gamma}$$

denote fixed values and ρ denotes a weighting factor;

S17. considering the total energy consumption of the users and a performance of federated learning, the optimization problem P of the system is:

$$\min_{q_m,h,f,t,p,b,\eta} \frac{a}{(1-\eta)} \left( \sum_{j \in N_m}^{|N_m|} \log\left(\frac{1}{\eta}\right) v C_i D_i f_i^2 + t_i p_i \right) + \frac{\rho}{N_m};$$

the constraints are:

C1: $0 \leq f_i \leq f_i^{max}$

C2: $0 \leq p_i \leq p_i^{max}$

C3: $I_g\left(t_i + I_i \frac{C_i D_i}{f_i}\right) \leq T$

C4: $t_i \geq \frac{s}{R_i}$

C5: $\|q_m - q_i\|_2^2 \leq r^2$

C6: $h^{min} \leq h \leq h^{max}$

C7: $\sum_{i \in N_m}^{|N_m|} b_i \leq B, b_i > 0$

Figure 1:
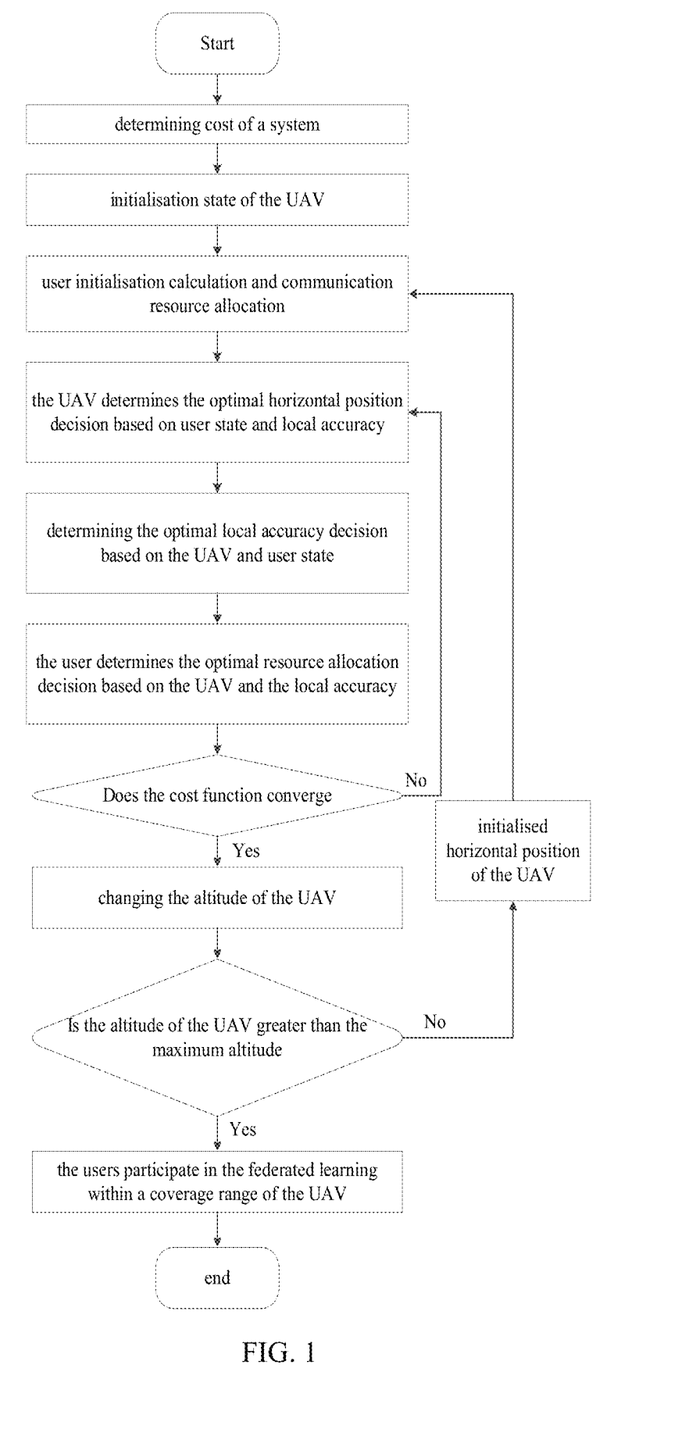
FIG. 1 is a flowchart according to embodiments of the present application.
Figure 2:
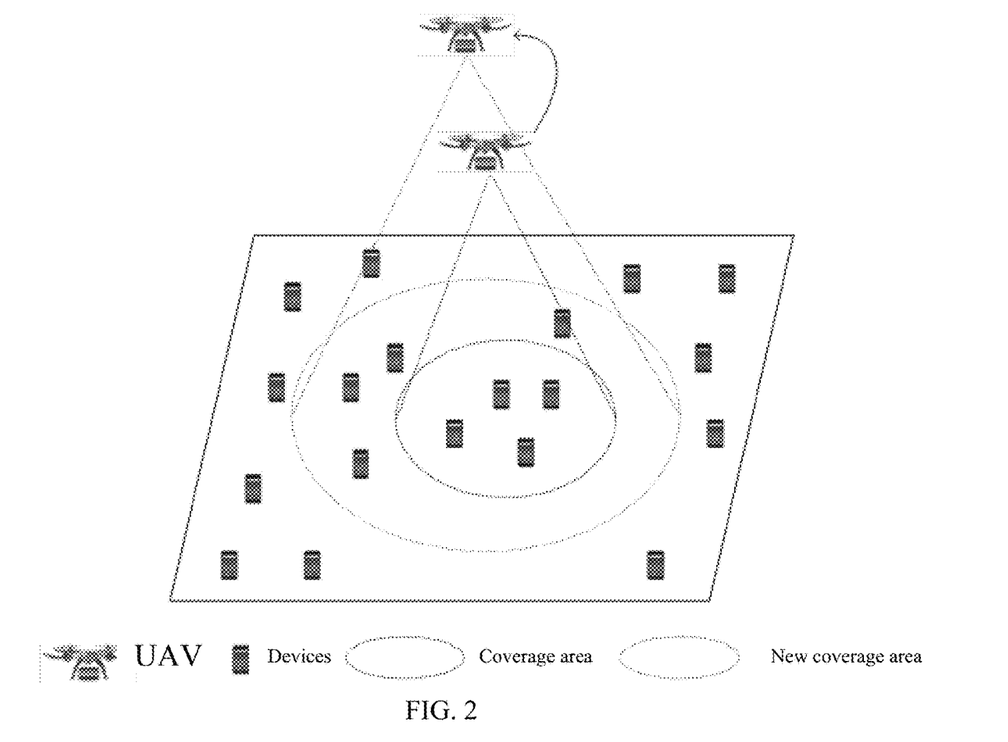
FIG. 2 is a schematic diagram of a system model according to embodiments of the present application.
Figure 3:
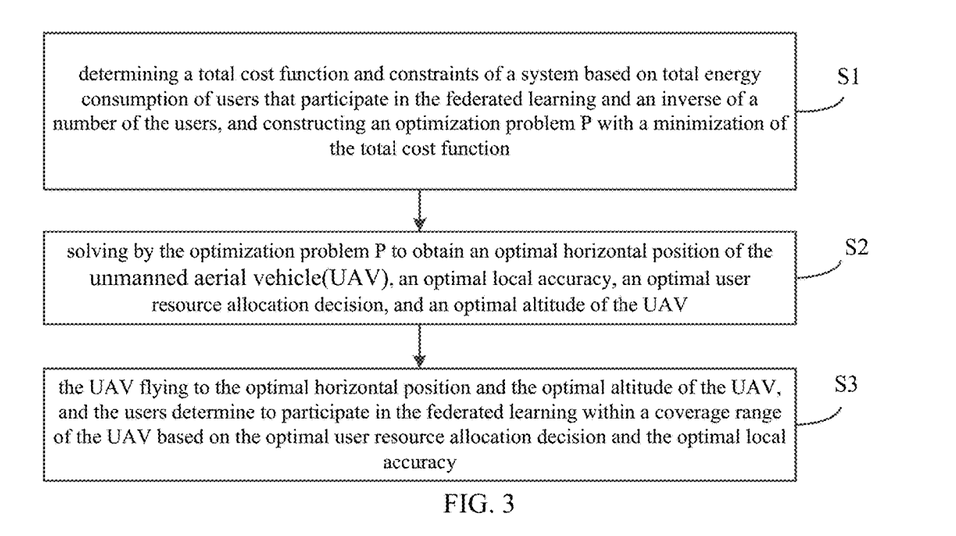
FIG. 3 is a flowchart according to embodiments of the present application.
Figure 4:
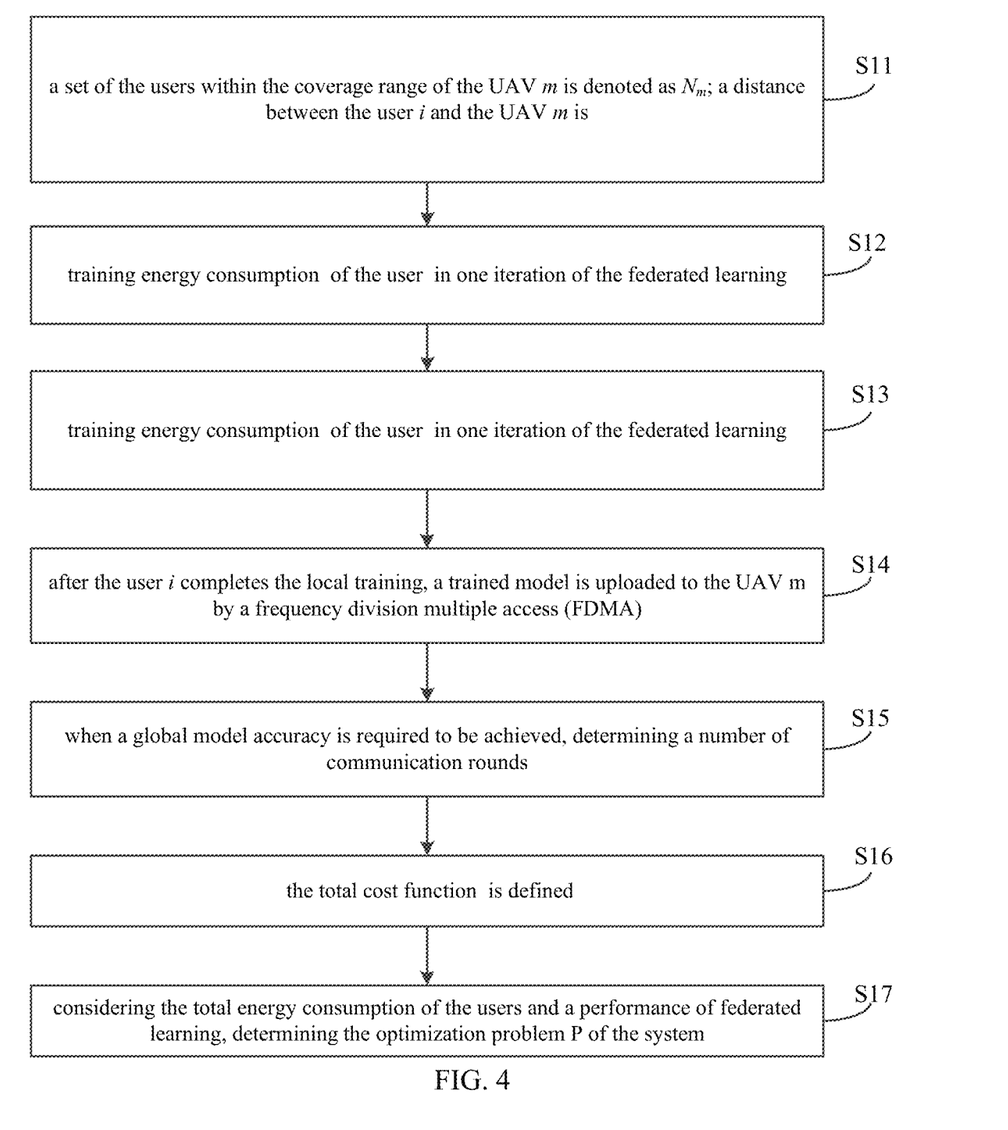
FIG. 4 is a flowchart according to embodiments of the present application.
Figure 5:
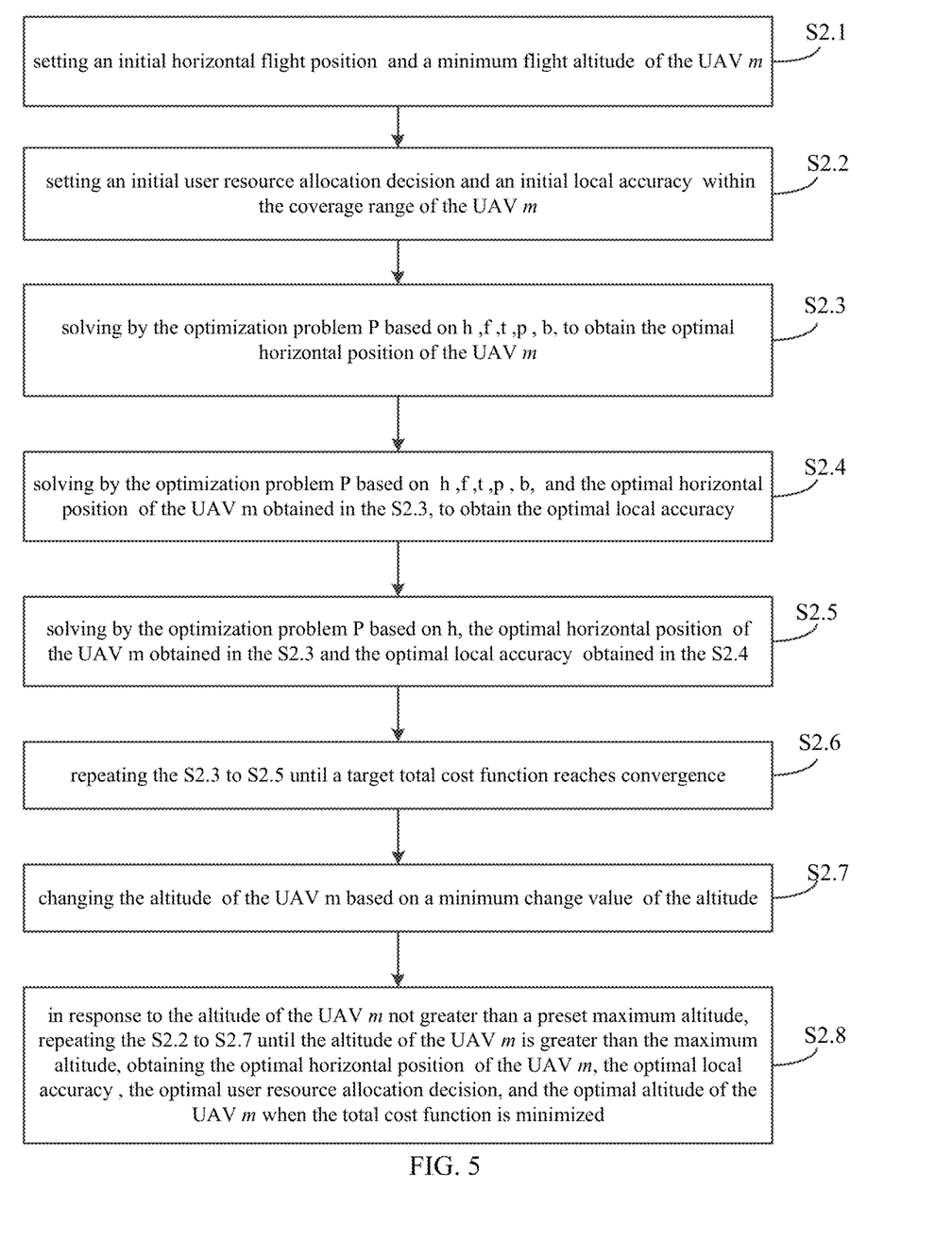
FIG. 5 is a flowchart according to embodiments of the present application.

As shown in FIG. 2, where T is a total pre-estimated completion time of the federated learning, B denotes a total bandwidth owned by the UAV m, $f_i^{max}$ denotes a maximum computation frequency of the user i, $p_i^{max}$ denotes a maximum transmission power of the user i, and, $h^{min}$ and $h^{max}$ denote a minimum altitude and a maximum altitude of the UAV m for flying, respectively; under a constraint of a maximum delay allowed by the federated learning, a position of the UAV m (the horizontal position $q_m = \{x,y\}$ and the altitude h), the transmission power $p = [p_1, \ldots p_{N_m}]$ and a computation frequency $f = [f_1, \ldots f_{N_m}]$ of the user i, a transmission bandwidth $b = [b_1, \ldots b_{N_m}]$, transmission time $t = [t_1, \ldots t_{N_m}]$ and the local accuracy η are optimized jointly to minimize the target function; constraints C1 and C2 limit the computation frequency and the transmission power of the user i; a constraint C3 denotes that a total delay of the users that participate in the federated learning is not greater than a preset maximum value; a constraint C4 limits the transmission delay, i.e., a transmission of the model must be completed within specified transmission time, and $R_i$ is the achievable transmission rate of the user i; a constraint C5 limits the position of the UAV m and the distance between the user and the UAV m not greater than the coverage range of the UAV m; a constraint C6 limits a flight altitude range of the UAV m, too low the altitude results in too few participating users, and too high the altitude results in a shortage of wireless resources, leading to a rise in delay when learning energy, both of which will slow down the convergence of federated learning; the constraint C7 indicates that a sum of the bandwidth allocated to all users within the coverage range of the UAV m is not greater than a total bandwidth B; and the constraint C8 specifies a range of constraints on the local training accuracy η.

An embodiment of the present application provides an UAV-assisted federated learning resource allocation method, in which the optimal resource allocation decision is obtained sequentially by successive convex approximation, Dinkelbach Method method, dichotomy method with KKT condition, so as to motivate more users to join the federated learning.

In some embodiment, the S2.3, solving by the optimization problem P to obtain the optimal horizontal position $q_m$ of the UAV m, includes:

the altitude of the UAV m is h, an angle of entrapment is θ, and a radius of coverage of the UAV m is r:

$r = h \tan(\theta);$ when h, f, t, p, b, η are determined, optimizing the horizontal position $q_m$ of the UAV m; since optimizing the horizontal position of the UAV m only affects the communication energy consumption of the user i; the optimization problem P is equivalent to an optimization problem P1:

$$\min_{q_m} \sum_{i \in N_m}^{|N_m|} p_i \frac{s}{R_i};$$

the constraints are:

$$t_i \geq \frac{s}{R_i} \quad \text{C4}$$

C5: $\|q_m - q_i\|_2^2 \leq r^2$;

introducing slack variables $\beta$, the optimization problem P1 is equivalent to an optimization problem P2:

$$\min_{q_m, \beta} \sum_{i \in N_m}^{|N_m|} p_i s \beta_i;$$

the constraints are:

C5: $\|q_m - q_i\|_2^2 \leq r^2$

C9: $s\beta_i \leq t_i$ $$b_i \log_2\left(1 + \frac{p_i g_0}{b_i N_0(\|q_m - q_i\|_2^2 + h^2)}\right) \geq \frac{1}{\beta_i}; \quad \text{C10}$$

introducing slack variables $S_{m,i} = \|q_m - q_i\|_2^2$, the constraint C10 is expanded at a feasible solution $S_{m,i}^0 = \|q_m^0 - q_i\|_2^2$ using a first-order Taylor expansion:

$$b_i \log_2\left(1 + \frac{p_i g_0}{b_i N_0(S_{m,i}^0 + h^2)}\right) \geq \lambda(S_{m,i} - S_{m,i}^0) + \kappa$$

$$\lambda = -\frac{b_i g_0 p_i \log_2(e)}{N_0 b_i (S_{m,i}^0 + h^2)\left(S_{m,i}^0 + h^2 + \frac{g_0 p_i}{N_0 b_i}\right)}$$

$$\kappa = b_i \log_2\left(1 + \frac{g_0 p_1}{N_0 b_i (S_{m,i}^0 + h^2)}\right);$$

where, $\lambda$, $\kappa$ denote intermediate variables; the optimization problem P2 is further transformed into an optimization problem P3:

$$\min_{q_m, \beta} \sum_{i \in N_m}^{|N_m|} p_i s \beta_i$$

the constraints are:

C5: $\|q_m - q_i\|_2^2 \leq r^2$

C9: $s\beta_i \leq t_i$ $$\lambda(S_{m,i} - S_{m,i}^0) + \kappa \geq \frac{1}{\beta_i}; \quad \text{C11}$$

the optimization problem P3 is transformed into a convex problem, which is solved using a successive convex approximation (SCA) method to obtain the optimal horizontal position of the UAV m.

When the UAV m arrives at the new position, the coverage position of the UAV changes, and due to the constraint C5, the original user is still within the range of the UAV m, but a new user may join, at this time, the values of the variables are re-initialised and the algorithm is re-iterated.

In some embodiment, the S2.4 solving by the optimization problem P to obtain the optimal local accuracy $\eta$ includes:

when h, $q_m$, f, t, p, b is determined, the optimization problem P is transformed into an optimization problem P4:

$$\min_{\eta} \frac{\lambda_1 \log_2\left(\frac{1}{\eta}\right) + \lambda_2}{(1 - \eta)};$$

the constraints are:

$$I_g\left(t_i + I_i \frac{C_i D_i}{f_i}\right) \leq T; \quad \text{C3}$$

C8: $0 \leq \eta \leq 1$ wherein $$\lambda_1 = a \sum_{i \in N_m}^{|N_m|} \kappa C_i D_i f_i^2, \quad \lambda_2 = a \sum_{i \in N_m}^{|N_m|} t_i p_i;$$

the constraint C3 is equivalent to $t_i \leq \upsilon(\eta_i)$, where $$\upsilon(\eta) = \frac{1 - \eta}{a} T + \frac{C_i D_i \log(\eta) \upsilon}{f_i},$$

since $\upsilon(\eta)$ is a convex function, the constraint C3 is transformed into $\eta^{min} \leq \eta \leq \eta^{max}$, where $$\eta^{max} = \min_{i \in N_m} \eta_i^{max}, \quad \eta^{min} = \max_{i \in N_m} \eta_i^{min};$$

the optimization problem P4 is transformed into an optimization problem P5:

$$\min_{\eta} \frac{\lambda_1 \log\left(\frac{1}{\eta}\right) + \lambda_2}{(1 - \eta)};$$

the constraints are:

C12: $\eta^{min} \leq \eta \leq \eta^{max}$;

solving the optimization problem P5 is equivalent to finding roots of a nonlinear function $$H(\zeta) = \min_{\eta^{min} \le \eta \le \eta^{max}} \lambda_1 \log(1/\eta) + \lambda_2 - \zeta(1-\eta),$$

which is solved by using a Dinkelbach Method method.

In some embodiment, the S2.5 solving by the optimization problem P to obtain the optimal user resource allocation decision, includes:

when $q_m$, h and η are determined, optimizing f, t, p and b, and the optimization problem P is transformed into an optimization problem P6:

$$\min_{f,t,p,b} \frac{a}{(1-\eta)} \sum_{i \in N_m}^{|N_m|} \left( v\log\left(\frac{1}{\eta}\right) C_i D_i f_i^2 + p_i t_i \right);$$

the constraints are:

C1: $0 \le f_i \le f_i^{max}$

C2: $0 \le p_i \le p_i^{max}$ $$I_g\left(t_i + I_l \frac{C_i D_i}{f_i}\right) \le T \quad \text{C3}$$

$$t_i \ge \frac{s}{R_i} \quad \text{C4}$$

$$\sum_{i \in N_m}^{|N_m|} b_i \le B, b_i > 0; \quad \text{C7}$$

the optimization problem P6 is split into two optimization subproblems;

a first subproblem, denoted as subproblem P6-1, is to solve remaining variables f, t and P of the optimization problem P6 under the transmission bandwidth b given:

$$\min_{f,t,p} \frac{a}{(1-\eta)} \sum_{i \in N_m}^{|N_m|} \left( v\log\left(\frac{1}{\eta}\right) C_i D_i f_i^2 + p_i t_i \right);$$

the constraints are:

C1: $0 \le f_i \le f_i^{max}$

C2: $0 \le p_i \le p_i^{max}$ $$I_g\left(t_i + I_l \frac{C_i D_i}{f_i}\right) \le T; \quad \text{C3}$$

$$t_i \ge \frac{s}{R_i}; \quad \text{C4}$$

$$f_i = \frac{I_l C_i D_i}{\frac{T}{I_g} - t_i}$$

and $$p_i = \frac{N_0 b_i}{g_i}\left(2^{\frac{s}{t_i b_i}} - 1\right)$$

are obtained according to the constraints C3, C4, and then are brought into the constraints C1, C2, and subproblem P6-1 is transformed into an optimization problem P7:

$$\min_{f,t,p} \frac{a}{(1-\eta)} \sum_{i \in N_m}^{|N_m|} \left( v\log\left(\frac{1}{\eta}\right) C_i D_i \left(\frac{I_l C_i D_i}{\frac{T}{I_g} - t_i^*}\right)^2 + \frac{N_0 b_i}{g_i}\left(2^{\frac{s}{t_i^* b_i}} - 1\right) t_i^* \right);$$

the constraints are:

$$0 \le \frac{I_l C_i D_i}{\frac{T}{I_g} - t_i} \le f_i^{max} \quad \text{C13}$$

$$0 \le \frac{N_0 b_i}{g_i}\left(2^{\frac{s}{t_i b_i}} - 1\right) \le p_i^{max}; \quad \text{C14}$$

a maximum value and a minimum value of $t_i$ are obtained from constraints C13 and C14; the optimization problem P7 is further transformed into an optimization problem P8:

$$\min_{t} \frac{a}{(1-\eta)} \sum_{i \in N_m}^{|N_m|} \left( v\log\left(\frac{1}{\eta}\right) C_i D_i \left(\frac{I_l C_i D_i}{\frac{T}{I_g} - t_i}\right)^2 + \frac{N_0 b_i}{g_i}\left(2^{\frac{s}{t_i b_i}} - 1\right) t_i \right);$$

the constraints are:

C15: $t_i^{min} \le t_i \le t_i^{max}$;

according to the optimization problem P8, when $t_i$ is satisfied $$\left|\frac{\partial E_i^{comm}}{\partial t_i}\right| = \left|\frac{\partial E_i^{comp}}{\partial t_i}\right|,$$

it is an optimal solution $t_i^*$, which is obtained using a bisection method, and $f_i^*$ and $p_i^*$ are further obtained;

the second subproblem, denoted as subproblem P6-2, is to solve the transmission bandwidth b of the optimization problem under variables f, t, p given:

$$\min_{b} \sum_{i \in N_m}^{|N_m|} \frac{b_i t_i N_0}{g_i}\left(2^{\frac{s}{t_i b_i}} - 1\right);$$

the constraints are:

$$\sum_{i \in N_m}^{|N_m|} b_i \le B, b_i > 0; \quad \text{C7}$$

since the optimization problem P8 is convex, an optimal expression of b is obtained by solving using the KKT condition;

optimizing the subproblem P6-2 leads to a change in bandwidth b, which in turn affects f, t, p, in the subproblem P6-1, and iteratively solves the subproblem P6-1 and subproblem P6-2 are solved by iteration to obtain the optimal f, t, p and b.

Second Embodiment

In a second aspect, the present application provides an UAV-assisted federated learning resource allocation device, including a processor and a storage medium;
wherein the storage medium is configured to store instructions;
the processor for operating in accordance with the instructions to perform the method according to the first embodiment.

Third Embodiment

In a third aspect, the present application provides a storage medium having a computer program stored thereon, wherein the computer program is executed by the processor to implement the method according to the first embodiment.

Fourth Embodiment

In a fourth aspect, the present application provides a computing device, including:
one or more processors, one or more memories, and one or more programs, wherein the one or more programs are stored in the one or more memories and configured to be executed by the one or more processors, wherein the one or more programs includes instructions for executing the method according to the method of the first embodiment.

It should be appreciated by those skilled in the art that embodiments of the present application may be provided as methods, systems, or computer program products. Accordingly, the present application may take the form of a fully hardware embodiment, a fully software embodiment, or an embodiment that combines software and hardware aspects. Further, the present application may take the form of a computer program product implemented on one or more computer-usable storage media (including, but not limited to, disk memory, CD-ROM, optical memory, and the like) that contain computer-usable program code therein.

The present application is described with reference to flowcharts and/or block diagrams of methods, devices (systems), and computer program products according to embodiments of the present application. It should be understood that each of the processes and/or boxes in the flowchart and/or block diagram, and the combination of processes and/or boxes in the flowchart and/or block diagram, may be implemented by computer program instructions. These computer program instructions may be provided to a processor of a general-purpose computer, a special-purpose computer, an embedded processor, or other programmable data-processing device to produce a machine, such that the instructions executed by the processor of the computer or other programmable data-processing device produce a device for carrying out the functions specified in the one process or multiple processes of the flowchart and/or the one box or multiple boxes of the box diagram.

These computer program instructions may also be stored in computer-readable memory capable of directing the computer or other programmable data processing device to operate in a particular manner such that the instructions stored in the computer-readable memory produce an article of manufacture comprising an instruction device that implements the function specified in the flowchart one process or a plurality of processes and/or one box or a plurality of boxes.

These computer program instructions may also be loaded onto a computer or other programmable data processing device, such that a series of operational steps are performed on the computer or other programmable device to produce computer-implemented processing, such that the instructions executed on the computer or other programmable device provide steps for implementing the functionality specified one process or a plurality of processes in the flowchart and/or the box diagram one box or a plurality of boxes in the box diag.

The above embodiments of the present application are described in detail in connection with the accompanying drawings, but the present application is not limited to the above embodiments, and various variations may be made within the scope of knowledge possessed by those skilled in the art without departing from the purposes of the present application.

What is claimed is:

1. A method of allocating resource by UAV-assisted federated learning, applied on an environment comprising a unmanned aerial vehicle (UAV) and user devices, and the UAV as an airborne base station is combined with federated learning, comprising:

S1. determining a total cost function and constraints of a system based on total energy consumption of user devices that participate in the federated learning and an inverse of a number of the user devices, and constructing an optimization problem P with a minimization of the total cost function;

S2. solving by the optimization problem P to obtain an optimal horizontal position of the (UAV), an optimal local accuracy, an optimal user resource allocation decision, and an optimal altitude of the UAV; and S3. controlling the UAV to fly to the optimal horizontal position and the optimal altitude of the UAV, and the user devices within a coverage range of the UAV determining to participate in the federated learning based on the optimal user resource allocation decision and the optimal local accuracy to upload neural network model parameters related to the data, and a main server securely aggregating the neural network model parameters and feed the neural network model parameters back to the user devices within the coverage range of the UAV for updating a global model according to the dataset owned by the user devices within the coverage range of the UAV;

wherein the S1, constructing the optimization problem P for minimizing the total cost function, comprises:

S11. a set of user devices is denoted as $N = \{1, 2 \ldots N\}$, a set of the user devices within the coverage range of the UAV is denoted as $N_m$; a distance between the user device i and the UAV is:

$$d_{im} = \sqrt{h^2 + \|q_m - q_i\|_2^2};$$

where h denotes the altitude of the UAV, $q_m = \{x_m, y_m\}$ denotes a horizontal position of the UAV, $q_i = \{x_i, y_i\}$ denotes a position of the user device i, and a channel gain of the user device i is:

$$g_i = g_0 \left(\frac{d_{im}}{d_0}\right)^{-\alpha};$$

where $g_0$ is a channel interference power at timed $d_0 = 1$ m and $\alpha$ is a path loss exponent;

S12. energy consumption of the user device during the federated learning comprises training energy and communication energy;

S13. $D_i$ denotes an amount of data of the user device, $f_i$ denotes a number of revolutions per second of a CPU of the user device i, $C_i$ denotes a number of revolutions of the CPU of the user device i to process a sample data, and $I_l$ denotes a number of rounds of local training when a local accuracy is achieved η;

$$I_l = \frac{2}{(2-L\delta)\delta\gamma}\log\left(\frac{1}{\eta}\right);$$

wherein L, γ are relevant parameters about a neural network loss function, δ is a training learning step of the federated learning;

training energy consumption $E_i^{comp}$ of the user device i in one iteration of the federated learning is denoted as:

$$E_i^{comp} = \kappa I_l C_i D_i f_i^2;$$

S14. after the user completes the local training, a trained model is uploaded to the UAV by a frequency division multiple access (FDMA); $b_i$ denotes a bandwidth allocated to the user device i, $p_i$ denotes a transmission power of the user device i, $N_0$ denotes a noise power spectral density, and according to a Shannon's formula an achievable transmission rate $R_i$ of the user device i is:

$$R_i = b_i \log_2\left(1 + \frac{g_i p_i}{N_0 b_i}\right);$$

assuming that a size of data of the neural network model w is s and communication energy consumption $E_i^{comp}$ of the user device i is:

$$E_i^{comm} = p_i t_i = p_i \frac{s}{b_i \log_2\left(1 + \frac{g_i p_i}{N_0 b_i}\right)};$$

S15. when a global model accuracy is required to be achieved $\varepsilon_0$ a number of communication rounds $I_g$ is:

$$I_g = \frac{2L^2}{\gamma^2 \xi}\log\frac{1}{\varepsilon_0}\frac{1}{1-\eta};$$

where ξ denotes relevant parameters in a local neural network training, a total energy consumption $E^{total}$ of a whole federated learning process is:

$$E^{total} = I_g \sum_{i \in N_m}^{|N_m|}(E_i^{comm} + E_i^{comp});$$

S16. the total cost function C is defined as:

$$C = E_{total} + \rho\frac{1}{N_m};$$

a target function is:

$$\min_{q_m,h,f,t,p,n,\eta} C = \min_{q_m,h,f,t,p,b,\eta} \frac{a}{(1-\eta)}\left(\sum_{i \in N_m}^{|N_m|}\log\left(\frac{1}{\eta}\right)vC_iD_if_i^2 + t_ip_i\right) + \frac{\rho}{N_m};$$

wherein $$a = \frac{2L^2}{\gamma^2\zeta}\log\frac{1}{\varepsilon_0}$$

and $$v = \frac{2}{(2-L\delta)\delta\gamma}$$

denote fixed values and ρ denotes a weighting factor;

S17. considering the total energy consumption of the user devices and a performance of federated learning, the optimization problem P of the system is:

$$\min_{q_m,h,f,t,p,b,\eta}\frac{a}{(1-\eta)}\left(\sum_{i\in N_m}^{|N_m|}\log\left(\frac{1}{\eta}\right)vC_iD_if_i^2 + t_ip_i\right) + \frac{\rho}{N_m};$$

the constraints are:

$$0 \leq f_i \leq f_i^{max} \qquad \text{C1}$$

$$0 \leq p_i \leq p_i^{max} \qquad \text{C2}$$

$$I_g\left(t_i + I_l\frac{C_iD_i}{f_i}\right) \leq T \qquad \text{C3}$$

$$t_i \geq \frac{s}{R_i} \qquad \text{C4}$$

$$\|q_m - q_i\|_2^2 \leq r^2 \qquad \text{C5}$$

$$h^{min} \leq h \leq h^{max} \qquad \text{C6}$$

$$\sum_{i \in N_m}^{|N_m|} b_i \leq B, b_i > 0 \qquad \text{C7}$$

$$0 \leq \eta \leq 1; \qquad \text{C8}$$

where T is a total pre-estimated completion time of the federated learning, B denotes a total bandwidth owned by the UAV, $f_i^{max}$ denotes a maximum computation frequency of the user device i, $p_i^{max}$ denotes a maximum transmission power of the user device i, and, $h^{min}$ and $h^{max}$ denote a minimum altitude and a maximum altitude of the UAV for flying, respectively; under a constraint of a maximum delay allowed by the federated learning, a position of the UAV, the transmission power p=[$p_1$, . . . $p_{N_m}$] and a computation frequency f=[$f_1$, . . . $f_{N_m}$] of the user device i, a transmission bandwidth b=[$b_1$, . . . $b_{N_m}$], transmission time t=[$t_1$ . . . $t_{N_m}$] and the local accuracy η are optimized jointly to minimize the target function; constraints C1 and C2 limit the computation frequency and the transmission power of the user device i; a constraint C3 denotes that a total delay of the user devices that participate in the federated learning is not greater than a preset maximum value; a constraint C4 limits the transmission delay, and $R_i$ is the achievable transmission rate of the user device i; a constraint C5 limits the position of the UAV m and the distance between the user device and the UAV not greater than the coverage range of the UAV; a constraint C6 limits a flight altitude range of the UAV; the constraint C7 indicates that a sum of the bandwidth allocated to all user devices within the coverage range of the UAV is not greater than a total bandwidth B; and the constraint C8 specifies a range of constraints on the local training accuracy.

2. The method of allocating resource by UAV-assisted federated learning according to claim 1,
wherein the S2. solving the optimization problem P comprises:
S2.1. setting an initial horizontal flight position $q_m$ and a minimum flight altitude h of the UAV;
S2.2. setting an initial user resource allocation decision and an initial local accuracy η within the coverage range of the UAV, wherein the user resource allocation decision comprises the computation frequency f, the transmission time t, the transmission power p and the transmission bandwidth b;
S2.3. solving by the optimization problem P based on h, f, t, p, b, η, to obtain the optimal horizontal position of the UAV;
S2.4. solving by the optimization problem P based on h, f, t, p, b and the optimal horizontal position $q_m$ of the UAV obtained in the S2.3, to obtain the optimal local accuracy η;
S2.5. solving by the optimization problem P based on h, the optimal horizontal position $q_m$ of the UAV obtained in the S2.3 and the optimal local accuracy η obtained in the S2.4;
S2.6. repeating the S2.3 to S2.5 until a target total cost function reaches convergence;
S2.7. changing the altitude h of the UAV based on a minimum change value $\Delta h_{min}$ of the altitude h;
S2.8. in response to the altitude of the UAV not greater than a preset maximum altitude, repeating the S2.2 to S2.7 until the altitude of the UAV is greater than the maximum altitude, obtaining the optimal horizontal position $q_m$ of the UAV, the optimal local accuracy η, the optimal user resource allocation decision, and the optimal altitude h of the UAV when the total cost function is minimized.

3. The method of allocating resource by UAV-assisted federated learning according to claim 2, wherein the S2.3, solving by the optimization problem P to obtain the optimal horizontal position of the UAV, comprises:
the altitude of the UAV is h, an angle of entrapment is θ, and a radius of coverage of the UAV is r:

$r = h \tan(\theta)$;

when h, f, t, p, b, q are determined, optimizing the horizontal position $q_m$ of the UAV; since optimizing the horizontal position of the UAV only affects the communication energy consumption of the user device i; the optimization problem P is equivalent to an optimization problem P1:

$$\min_{q_m} \sum_{i \in N_m}^{|N_m|} p_i \frac{s}{R_i};$$

the constraints are:

$$t_i \geq \frac{s}{R_i} \quad \quad C4$$

C5: $\|q_m - q_i\|_2^2 \leq r^2$;

introducing slack variables β, the optimization problem P1 is equivalent to an optimization problem P2:

$$\min_{q_m, \beta} \sum_{j \in N_m}^{|N_m|} p_i s \beta_i;$$

the constraints are:

C5: $\|q_m - q_i\|_2^2 \leq r^2$

C9: $s\beta_i \leq t_i$ $$b_i \log_2\left(1 + \frac{p_i g_0}{b_i N_0(\|q_m - q_i\|_2^2 + h^2)}\right) \geq \frac{1}{\beta_i}; \quad C10$$

introducing slack variables $S_{m,i} = \|q_m - q_i\|_2^2$, the constraint C10 is expanded at a feasible solution $S_{m,i}^0 = \|q_m^0 - q_i\|_2^2$ using a first-order Taylor expansion:

$$b_i \log_2\left(1 + \frac{p_i g_0}{b_i N_0(S_{m,i} + h^2)}\right) \geq \lambda(S_{m,i} - S_{m,i}^0) + \kappa$$

$$\lambda = -\frac{b_i g_0 p_i \log_2(e)}{N_0 b_i (S_{m,i}^0 + h^2)\left(S_{m,i}^0 + h^2 + \frac{g_0 p_i}{N_0 b_i}\right)}$$

$$\kappa = b_i \log_2\left(1 + \frac{g_0 p_i}{N_0 b_i (S_{m,i}^0 + h^2)}\right);$$

where, λ, κ denote intermediate variables; the optimization problem P2 is further transformed into an optimization problem P3:

$$\min_{q_m, \beta} \sum_{j \in N_m}^{|N_m|} p_i s \beta_i$$

the constraints are:

C5: $\|q_m - q_i\|_2^2 \leq r^2$

C9: $s\beta_i \leq t_i$ $$\lambda(S_{m,i} - S_{m,i}^0) + \kappa \geq \frac{1}{\beta_i}; \quad C11$$

the optimization problem P3 is transformed into a convex problem, which is solved using a successive convex approximation (SCA) method to obtain the optimal horizontal position of the UAV.

4. The method of allocating resource by UAV-assisted federated learning according to claim 2, wherein the S2.4 solving by the optimization problem P to obtain the optimal local accuracy η, comprises:

when h, $q_m$, f, t, p, b is determined, the optimization problem P is transformed into an optimization problem P4:

$$\min_{\eta} \frac{A_1 \log_2\left(\frac{1}{\eta}\right) + \lambda_2}{(1-\eta)};$$

the constraints are:

$$I_g\left(t_i + I_l \frac{C_i D_i}{f_i}\right) \le T; \quad C3$$

C8: $0 \le \eta \le 1$ wherein $$\lambda_1 = a \sum_{i \in N_m}^{|N_m|} \kappa C_i D_i f_i^2, \quad \lambda_2 = a \sum_{i \in N_m}^{|V_m|} t_i p_i;$$

the constraint C3 is equivalent to $t_i \le \upsilon(\eta_i)$, where $$\upsilon(\eta) = \frac{1-\eta}{a} T + \frac{C_i D_i \log(\eta) v}{f_i},$$

since $\upsilon(\eta)$ is a convex function, the constraint C3 is transformed into $\eta^{min} \le \eta \le \eta^{max}$, where $$\eta^{max} = \min_{i \in N_m} \eta_i^{max}, \quad \eta^{min} = \max_{i \in N_m} \eta_i^{min};$$

the optimization problem P4 is transformed into an optimization problem P5:

$$\min_{\eta} \frac{\lambda_1 \log\left(\frac{1}{\eta}\right) + \lambda_2}{(1-\eta)};$$

the constraints are:

C12: $\eta^{min} \le \eta \le \eta^{max}$;

solving the optimization problem P5 is equivalent to finding roots of a nonlinear function $$H(\zeta) = \min_{\eta^{min} \le \eta \le \eta^{max}} \lambda_1 \log(1/\eta) + \lambda_2 - \zeta(1-\eta),$$

which is solved by using a Dinkelbach Method method.

5. The method of allocating resource by UAV-assisted federated learning according to claim 2, wherein the S2.5 solving by the optimization problem P to obtain the optimal user resource allocation decision, comprises:

when $q_m$, h and $\eta$ are determined, optimizing f, t, p and b, and the optimization problem P is transformed into an optimization problem P6:

$$\min_{f,t,p,b} \frac{a}{(1-\eta)} \sum_{i \in N_m}^{|N_m|} \left(v \log\left(\frac{1}{\eta}\right) C_i D_i f_i^2 + p_i t_i\right);$$

the constraints are:

C1: $0 \le f_i \le f_i^{max}$

C2: $0 \le p_i \le p_i^{max}$ $$I_g\left(t_i + I_l \frac{C_i D_i}{f_i}\right) \le T \quad C3$$

$$t_i \ge \frac{s}{R_i} \quad C4$$

$$\sum_{i \in N_m}^{|N_m|} b_i \le B, \quad b_i > 0; \quad C7$$

the optimization problem P6 is split into two optimization subproblems;

a first subproblem, denoted as subproblem P6-1, is to solve remaining variables f, t and p of the optimization problem P6 under the transmission bandwidth b given:

$$\min_{f,t,p} \frac{a}{(1-\eta)} \sum_{i \in N_m}^{|N_m|} \left(v \log\left(\frac{1}{\eta}\right) C_i D_i f_i^2 + p_i t_i\right);$$

the constraints are:

C1: $0 \le f_i \le f_i^{max}$

C2: $0 \le p_i \le p_i^{max}$ $$I_g\left(t_i + I_l \frac{C_i D_i}{f_i}\right) \le T \quad C3$$

$$t_i \ge \frac{s}{R_i}; \quad C4$$

$$f_i = \frac{I_l C_i D_i}{\frac{T}{I_g} - t_i} \quad \text{and} \quad p_i = \frac{N_0 b_i}{g_i}\left(2^{\frac{s}{t_i b_i}} - 1\right)$$

are obtained according to the constraints C3, C4, and then are brought into the constraints C1, C2, and subproblem P6-1 is transformed into an optimization problem P7:

$$\min_{f,t,p} \frac{a}{(1-\eta)} \sum_{i \in N_m}^{|N_m|} \left(v \log\left(\frac{1}{\eta}\right) C_i D_i \left(\frac{I_l C_i D_i}{\frac{T}{I_g} - t_i^*}\right)^2 + \frac{N_0 b_i}{g_i}\left(2^{\frac{s}{t_i^* b_i}} - 1\right) t_i^*\right);$$

the constraints are:

$$0 \le \frac{I_l C_i D_i}{\frac{T}{I_g} - t_i} \le f_i^{max} \quad C13$$

-continued $$0 \leq \frac{N_0 b_i}{g_i}\left(2^{\frac{s}{t_i b_i}} - 1\right) \leq p_i^{max};\qquad C14$$

a maximum value and a minimum value of $t_i$ are obtained from constraints C13 and C14; the optimization problem P7 is further transformed into an optimization problem P8:

$$\min_{t} \frac{a}{(1-\eta)} \sum_{i \in N_m}^{|N_m|} \left( v\log\left(\frac{1}{\eta}\right) C_i D_i \left(\frac{I_i C_i D_i}{\frac{T}{I_g} - t_i}\right)^2 + \frac{N_0 b}{g_i}\left(2^{\frac{s}{t_i b_i}} - 1\right) t_i \right);$$

the constraints are:

C15: $t_i^{min} \leq t_i \leq t_i^{max}$;

according to the optimization problem P8, when t is satisfied $$\left|\frac{\partial E_i^{comm}}{\partial t_i}\right| = \left|\frac{\partial E_i^{comp}}{\partial t_i}\right|,$$

it is an optimal solution $t_i^*$, which is obtained using a bisection method, and $f_i^*$ and $p_i^*$ are further obtained;
the second subproblem, denoted as subproblem P6-2, is to solve the transmission bandwidth b of the optimization problem under variables f, t, p given:

$$\min_{b} \sum_{i \in N_m}^{|N_m|} \frac{b_i t_i N_0}{g_i}\left(2^{\frac{s}{t_i b_i}} - 1\right);$$

the constraints are:

$$\sum_{i \in N_m}^{|N_m|} b_i \leq B, b_i > 0;\qquad C7$$

since the optimization problem P8 is convex, an optimal expression of b is obtained by solving using the KKT condition;

optimizing the subproblem P6-2 leads to a change in bandwidth b, which in turn affects f, t, p, in the subproblem P6-1, and iteratively solves the subproblem P6-1 and subproblem P6-2 are solved by iteration to obtain the optimal f, t, p and b.

6. A device of allocating resource by UAV-assisted federated learning, comprising a processor and a storage medium;

wherein the storage medium is configured to store instructions;

the processor for operating in accordance with the instructions to perform the method according to claim 1.

7. A storage medium having a computer program stored thereon, wherein the computer program is executed by the processor to implement the method according to claim 1.

8. A computing device, comprising:

one or more processors, one or more memories, and one or more programs, wherein the one or more programs are stored in the one or more memories and configured to be executed by the one or more processors, wherein the one or more programs comprises instructions for executing the method according to claim 1.

* * * * *